(12) United States Patent
Drouard

(10) Patent No.: US 8,270,799 B2
(45) Date of Patent: Sep. 18, 2012

(54) TELECOMMUNICATIONS CABLE INLET DEVICE

(75) Inventor: Patrick Drouard, Pontchateau (FR)

(73) Assignee: 3M Innovative Properties Company, St. Paul, MN (US)

( * ) Notice: Subject to any disclaimer, the term of this patent is extended or adjusted under 35 U.S.C. 154(b) by 266 days.

(21) Appl. No.: 12/738,935

(22) PCT Filed: Oct. 17, 2008

(86) PCT No.: PCT/US2008/080252
§ 371 (c)(1),
(2), (4) Date: Apr. 20, 2010

(87) PCT Pub. No.: WO2009/067311
PCT Pub. Date: May 28, 2009

(65) Prior Publication Data
US 2010/0209057 A1    Aug. 19, 2010

Related U.S. Application Data

(60) Provisional application No. 60/988,851, filed on Nov. 19, 2007.

(51) Int. Cl.
*G02B 6/00* (2006.01)
(52) U.S. Cl. ........................................................ 385/138
(58) Field of Classification Search .................... 385/138
See application file for complete search history.

(56) References Cited

U.S. PATENT DOCUMENTS

| | | | |
|---|---|---|---|
| 5,416,874 A | 5/1995 | Giebel et al. | |
| 6,487,344 B1 * | 11/2002 | Naudin et al. | 385/100 |
| 6,870,106 B1 | 3/2005 | Schiffbauer et al. | |
| 7,146,090 B2 * | 12/2006 | Vo et al. | 385/138 |
| 7,740,409 B2 | 6/2010 | Bolton et al. | |
| RE41,743 E * | 9/2010 | Naudin et al. | 385/100 |
| 2004/0086254 A1 | 5/2004 | Vastmans | |
| 2007/0036488 A1 | 2/2007 | Harrison et al. | |
| 2008/0013888 A1 | 1/2008 | Barnes et al. | |
| 2009/0060421 A1 | 3/2009 | Parikh et al. | |
| 2010/0086260 A1* | 4/2010 | Parikh et al. | 385/76 |

FOREIGN PATENT DOCUMENTS

| | | |
|---|---|---|
| EP | 0 239 402 A2 | 9/1987 |
| FR | 2 662 270 A1 | 11/1991 |

* cited by examiner

*Primary Examiner* — Sung Pak
(74) *Attorney, Agent, or Firm* — Janet A. Kling

(57) ABSTRACT

An inlet device is described for inserting a telecommunication cable into a telecommunications enclosure. The inlet device includes a housing compressible portion and a strength member securing section configured to fasten at least one strength member of the cable to the housing. The cable is centered in the housing when a protective sleeve is applied over a compressible portion of the housing. A method for preparing a cable assembly is also described. A telecommunications enclosure including an inlet device is also described.

16 Claims, 5 Drawing Sheets

TELECOMMUNICATIONS CABLE INLET DEVICE

CROSS REFERENCE TO RELATED APPLICATIONS

This application is a national stage filing under 35 U.S.C. 371 of PCT/US2008/080252, filed Oct. 17, 2008, which claims priority to U.S. Provisional Application No. 60/988,851, filed Nov. 19, 2007, the disclosure of which is incorporated by reference in its/their entirety herein.

FIELD OF THE INVENTION

The present invention relates to an inlet device for inserting a cable containing optical fibers into a telecommunication's enclosure, e.g. into a terminal closure, pre-stubbed terminal, optical network terminal or other junction box.

BACKGROUND OF THE INVENTION

Telecommunication cables are ubiquitous and used for distributing data across vast networks. The majority of cables are electrically conductive cables (typically copper), although the use of optical fiber cables is growing rapidly in telecommunication networks as larger and larger amounts of data are transmitted. Additionally, as data transmissions increase, the fiber optic network is being extended closer to the end user which can be a premise, business, or a private residence.

As telecommunication cables are routed across data networks, it is necessary to periodically open the cable so that one or more telecommunication lines therein may be spliced, thereby allowing data to be distributed to other cables or "branches" of the telecommunication network. At each point where a telecommunication cable is opened, it is necessary to provide a telecommunications enclosure to protect the exposed interior of the cable. The cable branches may be further distributed until the network reaches individual homes, businesses, offices, and so on. These networks are often referred to as fiber to the premise (FTTP) or fiber to the home (FTTH) networks.

In an FTTH network, optical fiber is brought to the end user and connected to the optical network terminal (ONT) unit mounted on a wall at the end user. The ONT converts this optical signal into conventional electrical signals to provide voice (telephone), Internet (data) and video signals to the end user.

Fiber terminals are one type of telecommunications enclosure that is typically located near an end user in a FTTP network to distribute the final service to the end user. Typical fiber terminals are designed to drop services (to provide service connections) to a small number of premises having typically between four to twelve end users. The last service connection from the fiber terminal is made to the ONT, located at the end user using a drop cable. Typically, an optical connector attached to the terminal end of an optical fiber of the cable is preferred to allow quick, reliable field installation.

There are two basic types of fiber terminals used in the FTTP networks: integrated terminal closures and pre-stubbed terminals. Pre-stubbed terminals include an installed multi-fiber cable which may vary in length from 50 ft to 5000 ft. One end of this cable is usually connected to a distribution cable in distribution splice closure. The other end of this multi-fiber cable, typically having between 4 to 12 optical fibers, is terminated with a conventional industry standard connector such as an SC APC connector. This cable assembly may be referred to as a multi-fiber fanout cable assembly. The pre-connectorized end of the multi-fiber cable may be provided separately or be pre-installed in the pre-stubbed terminal when supplied to the customer. A pre-terminated single fiber drop cable may have one or both ends pre-terminated with an optical connector.

Many conventional closures utilize either a mastic or rubber grommet for introducing cables into a telecommunication enclosure. Conventional inlet devices are described in U.S. Pat. No. 6,487,344 and U.S. Patent application Nos. 60/895,233 and 60/895,247 which can be inserted into a port in the wall of a telecommunications enclosure.

SUMMARY OF THE INVENTION

An inlet device to be fitted to a communication cable includes a tubular housing and a compression member. The tubular housing has a compressible portion at the first end of the housing to conform to an outer surface of the communication cable, and a strength member securing section formed on the second end of the housing. The strength member securing section may be configured to secure a strength member of an optical fiber cable to the housing. The compression member may be fitted over the compressible portion to center the communication cable in the inlet device.

In an alternative embodiment, the inlet device may be installed in a telecommunication enclosure.

The above summary of the present invention is not intended to describe each illustrated embodiment or every implementation of the present invention. The figures and the detailed description that follows more particularly exemplify these embodiments.

BRIEF DESCRIPTION OF THE DRAWINGS

The present invention will be further described with reference to the accompanying drawings, wherein.

DETAILED DESCRIPTION OF THE DRAWINGS

In the following detailed description of the preferred embodiments, reference is made to the accompanying drawings, which form a part hereof, and in which is shown by way of illustration specific embodiments in which the invention may be practiced. The illustrated embodiments are not intended to be exhaustive of all embodiments according to the invention. It is to be understood that other embodiments may be utilized and structural or logical changes may be made without departing from the scope of the present invention. The following detailed description, therefore, is not to be taken in a limiting sense, and the scope of the present invention is defined by the appended claims.

Exemplary embodiments herein provide an inlet device for the insertion of an optical fiber cable into a telecommunications enclosure. Particular advantages of the design of the present inlet device include a low cost, field installable inlet device that centers either single fiber cables or multi-fiber cables within the device. The inventive inlet device has fewer parts than some conventional inlet devices which makes it easier to install in the field.

Figure 1:
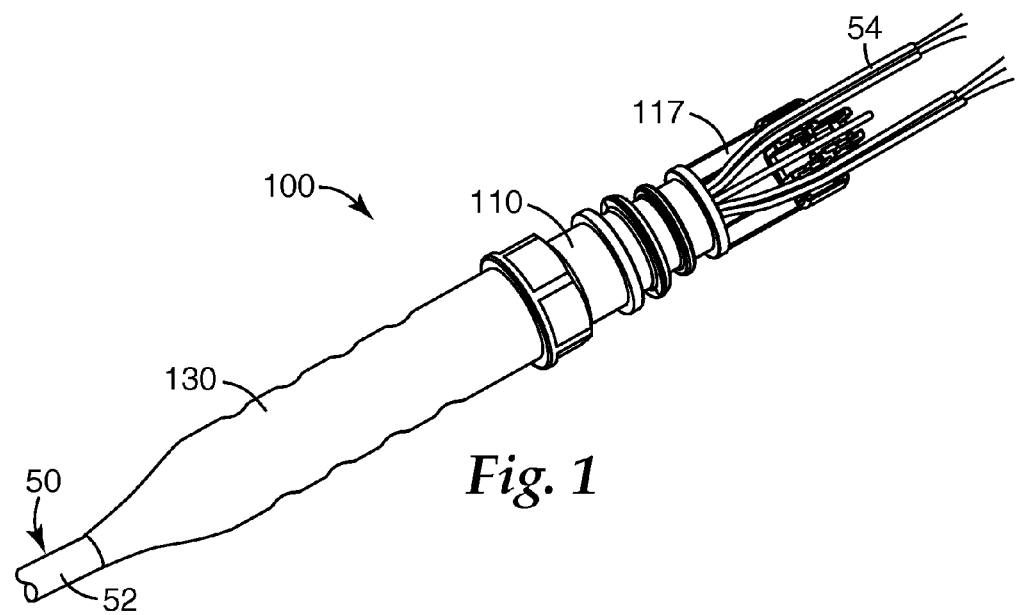
FIG. 1 shows an inlet device according to an embodiment of the present invention.

FIG. 1 shows an inlet device 100 mounted on an end of a telecommunication cable such as a fiber optic cable 50. Alternatively, the telecommunication cable could be a copper cable containing twisted pairs of copper wires or a coax cable. While FIG. 1 shows a cable having a single inlet device 100, an alternative embodiment of the cable assembly may have the exemplary inlet device installed on both ends of the cable. The telecommunication cable may be an electrical cable or an optical fiber cable. For simplicity, an exemplary embodiment of the inlet device for use with an optical fiber cable will be described herein.

In one exemplary embodiment, the telecommunication cable is a fiber optic cable. The fiber optic cable typically includes a semi-rigid outer sheath 52 surrounding at least one optical fiber 54 and at least one strength member 56 (see in FIG. 2). The optical fibers 54 may be enclosed in one or more loose buffer tubes 58 or may be provided as one or more optical fiber ribbon cables (not shown). One to twelve optical fibers may reside in the loose buffer tube surrounded by a water-blocking gel or grease. Each of the ribbon cables may have from one to about twenty-four optical fibers. Each optical fiber has a polymeric coating that surrounds and protects the glass fiber. Examples of exemplary optical fiber cables include ResiLink ADF™ All-Dielectric Flat Drop Cable available from Pirelli Cables and System (Columbia, N.C.), and Mini DP Flat Drop Cable available from OFS (Northcross, Ga.). The optical fiber has a polymeric coating that surrounds and protects the glass fiber. The strength members may be either semi-rigid rods or a collection of loose fibers e.g. made of aramid fibers.

In the case of a fiber optic cable assembly having an exemplary inlet device 100 mounted on an end of the optical fiber cable, the connection to the other end of the cable may be made using mechanical splices, fusion splices or field mounted connectors. Optionally, the optical fibers at an end of the optical fiber cable may be terminated with one or more optical fiber connectors.

Figure 3A:
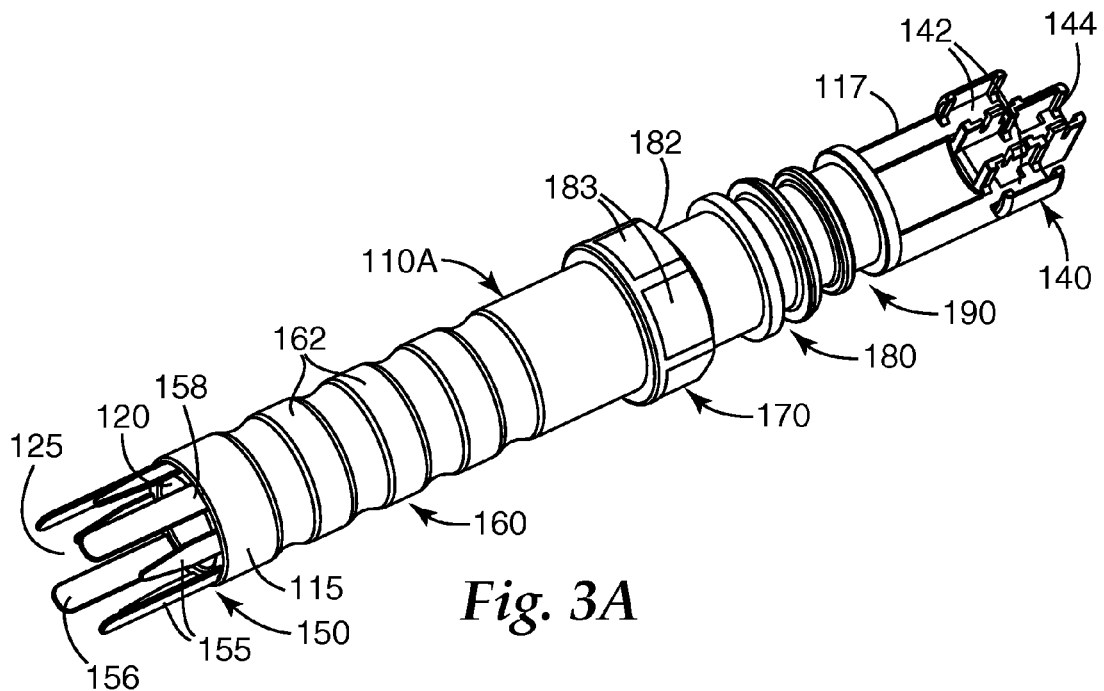
FIGS. 3A-D show isometric views of exemplary embodiments of a tubular housing according to an embodiment of the present invention.
Figure 3B:
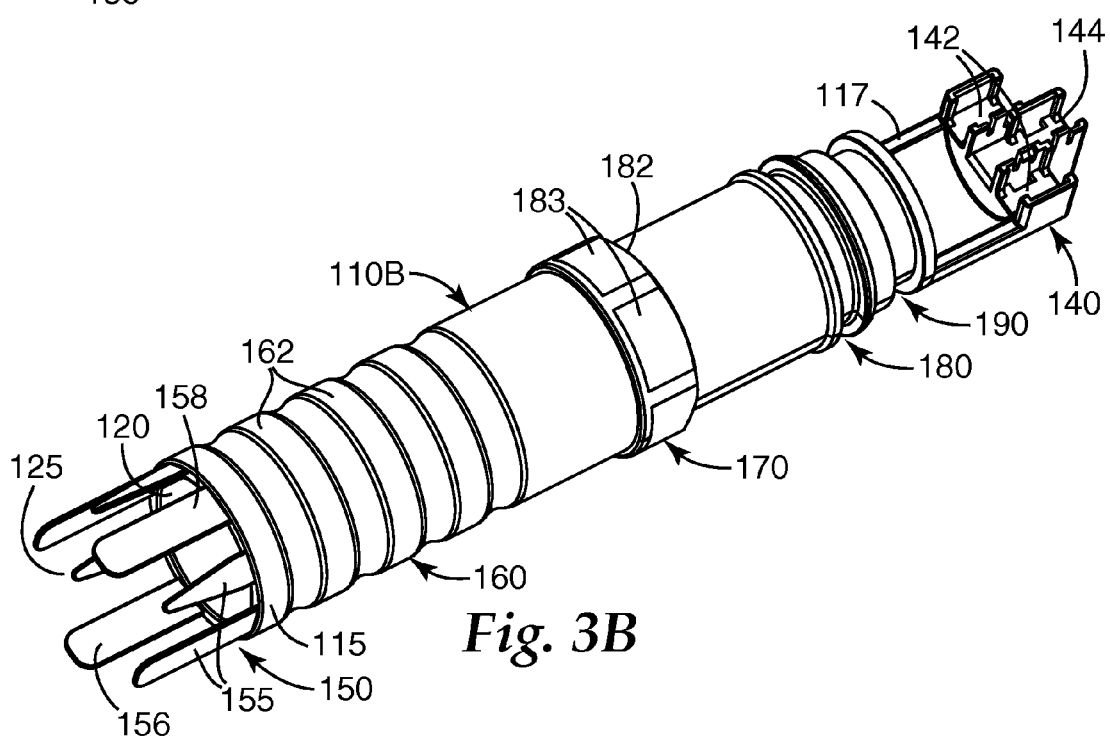
Figure 3C:
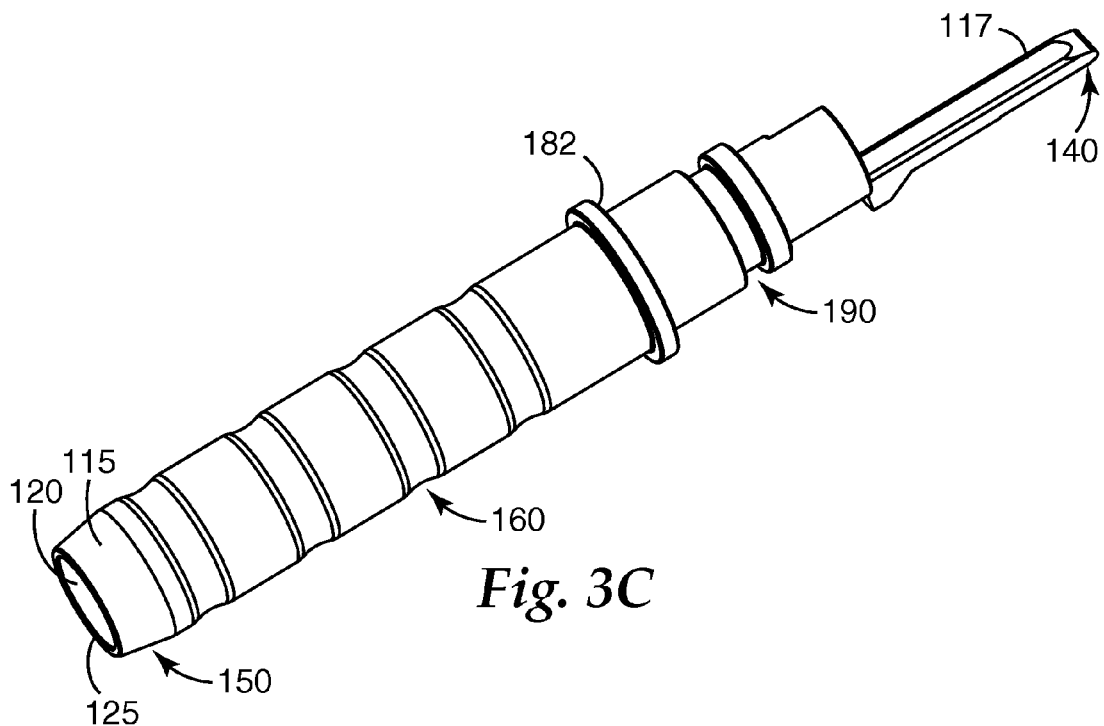

The inlet device 100 includes a tubular housing 110 having a first end 115 (see FIGS. 3A-C) and a second end 117 and a protective sleeve 130 attached to the first end of the housing. FIGS. 3A-C show exemplary embodiments of tubular housings 110A-C that may be used in the inlet device 100 of FIG. 1. The tubular housing may be cylindrical in shape and includes an interior passageway 120 that extends along the length of the housing from the first end 115 to the second end 117 of the housing. The housing includes a passage entry 125 at the first end 115 of the interior passageway that may be configured to accommodate certain categories of telecommunication cables including single fiber drop cables and multi-fiber cables.

In the case of a fiber optic cable, the connection to the ends of the cable may be made using a mechanical splice, a fusion splice or a field mounted connector.

FIGS. 3A and 3B show two similar embodiments the tubular housings 110A and 110B including a compressible portion 150 formed at the first end 115 of the tubular housing. The compressible portion 150 may be reduced in size when an external force is radially exerted on it such as by application of a protective sleeve 130 (FIGS. 1 and 6). The compressible portion 150 centers the telecommunication cable in the inlet device when the inlet device is installed on the telecommunication cable. The compressible portion 150 may include a plurality of spaced apart flexible fingers 155 which surround the passage entry 125. In an alternative embodiment, the compressible portion may include a fluted passage entry (not shown). In another exemplary embodiment shown in FIG. 3C, the compressible portion may include a section of the tubular housing which has been thinned to increase its conformability when an external force is exerted upon it.

The flexible fingers 155 may be rectangular, triangular or trapezoidal in shape or a combination thereof. When the fingers have a trapezoidal or triangular shape, the terminal end 156 of the finger may be narrower than at the base 158 of the finger. In some embodiments of the invention, the flexible fingers 155 may include barbs (not shown) on the terminal ends 156 of the fingers that penetrate and grab the outer sheath of a telecommunications cable that is installed in the inlet device 100. The fingers should be spaced apart by a sufficient distance so that they do not overlap after deformation caused by the application of the external force on the compressible portion of the tubular housing. The number, shape width and length of the fingers may be optimized based on the diameter of the tubular housing and the diameter of the telecommunication cables to be accommodated by the inlet device.

In one exemplary embodiment, the flexible fingers 155 simultaneously bend toward the cable when a protective sleeve 130 is applied to the compressible portion 150 of the tubular housing 110. Thus, the fingers keep the cable centered at the first end 115 of the body of the inlet device 100. The protective sleeve 130 may include molded preformed strain relief boots, a recoverable sleeve, or adhesive coated heat shrink tubing such as HDT-A 38/12 tubing available from 3M Company (St. Paul, Minn.).

Figure 5:
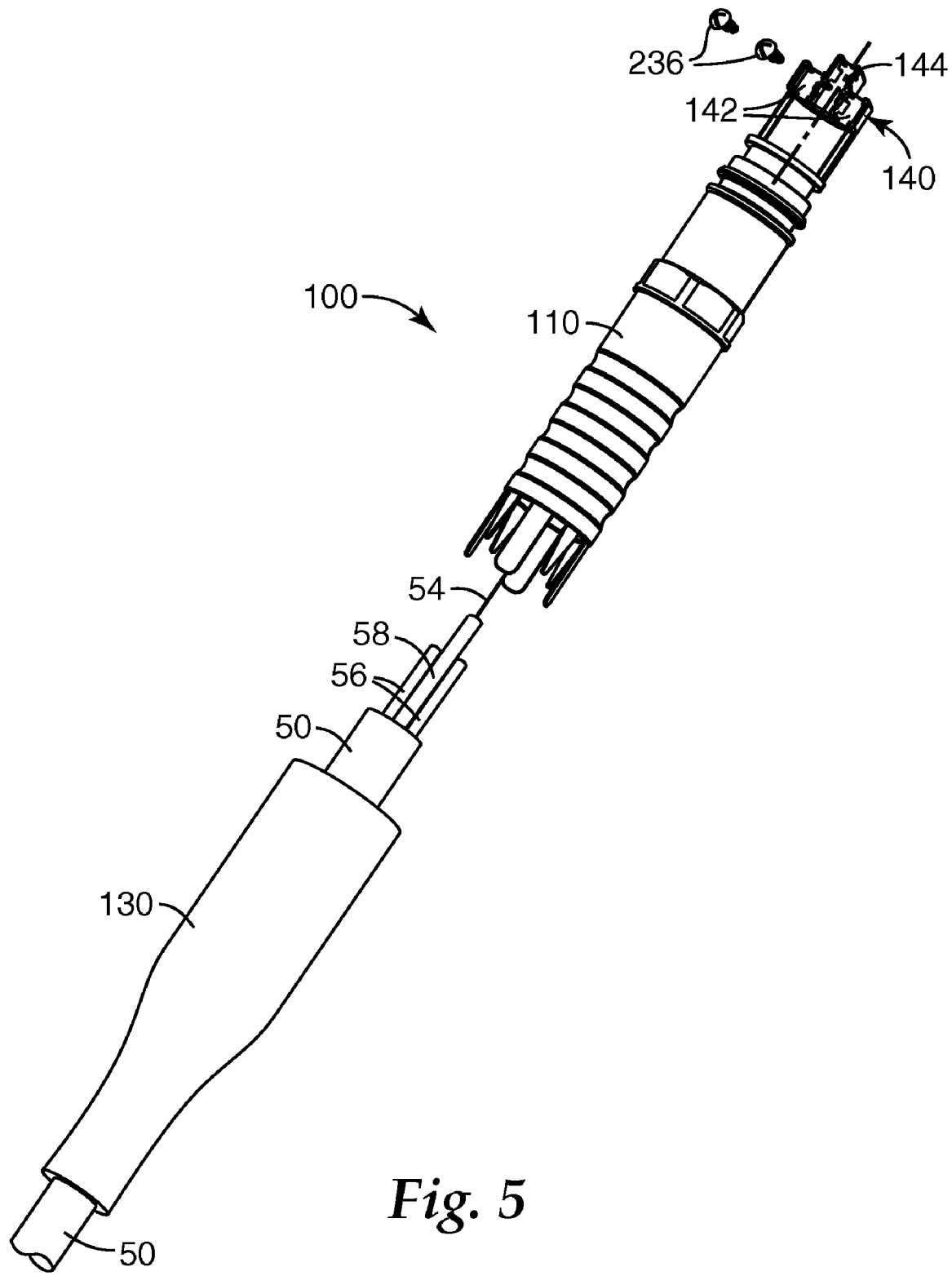
FIG. 5 shows an exploded view of an inlet device according to an embodiment of the present invention While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

The tubular housing 110A may also include an integral strength member securing section 140 formed at the second end 117 of the tubular housing. The strength member securing section can be configured to fasten at least one strength member 56 (in FIG. 1) of the telecommunication cable to the tubular housing. FIG. 6 shows that the strength member securing section 140 includes a furcated structure having a central channel 144 for the optical fibers 54 to pass through and at least one peripheral channel 142 for securing at least one strength member 56. When a strength member 56 is inserted into a peripheral channel 142, it can be locked in place by at least one mechanical fastener 236 or pin (shown in FIG. 5) such that the strength member 56 is trapped between the mechanical fastener 236 and the peripheral channel 142.

In addition, securing of the strength members 56 in the peripheral channels 142 and the optical fibers 54 in the central channel 144 ensure that the cable is centered at the second end 117 of the tubular housing 110. Alternatively, the strength member(s) 56 may be secured in the central channel and the optical fibers 54 may be secured in the one or more peripheral channels if necessitated by the design of the optical fiber cable (See FIG. 1).

Other features of the tubular housing 110 may include cable strain relief attachment surface 160, an orientation control section 170, an annular channel 180 to hold a sealing member (not shown), and a lock engagement feature 190.

FIGS. 3A and 3B show the cable strain relief attachment surface 160 is located between the passage entry 125 and the orientation control section 170. The protective sleeve 130 (FIG. 6) can fit over the cable strain relief attachment surface to secure and provide a water resistant and/or dustproof seal around the telecommunication cable when it is installed in the inlet device. This protective sleeve 130 also provides a strain relief to the cable by maintaining the proper bend radius of the cable when it is installed in a telecommunications enclosure. Also, the cable strain relief member provides retention of the cable against pull-out forces.

In one embodiment, the cable strain relief attachment surface 160 may have a smooth surface texture. In another embodiment, the cable strain relief attachment surface may have a ribbed, undulating or other rough surface texture. FIGS. 3A-B show embodiments of the tubular housing 110A, B of the cable strain relief attachment surface 160 having ridges 162. It may be advantageous to have a ribbed, undulating or other rough surface texture on the cable strain relief attachment surfaces to improve the mechanical strength of the attachment of the protection sleeve 130 to the tubular housing 110A, B, C.

The protective sleeve 130 attaches to the cable strain relief attachment surface 160 and extends for some distance from the first end 115 of the tubular housing (e.g. about 7.6 cm (3.0 in.) to about 15.2 cm (6.0 in.)).

Figure 4A:
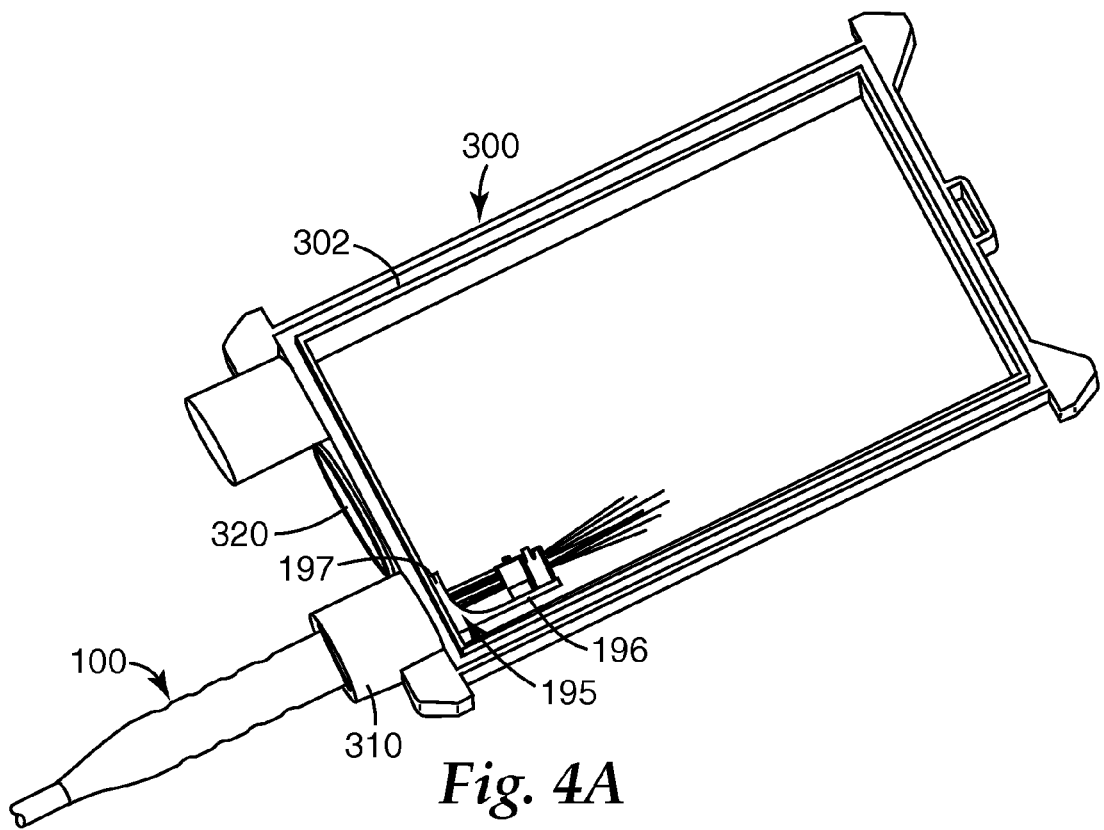
FIGS. 4A-B show isometric views of an inlet device according to an embodiment of the present invention installed in a telecommunication enclosure.

The orientation control section 170 may be utilized when the inlet device 100 is inserted into port 310 having a complementary port structure in a telecommunications enclosure 300 in a known or controlled orientation (FIG. 4A). The telecommunication enclosure comprises a base 302, a cover (not shown) and a plurality of ports in one or both end faces of the telecommunication enclosure as shown in FIG. 4A such as a BPEO closure available from 3M Company, St. Paul, Minn. Alternatively the telecommunication enclosure may be a dome style closure such as a FDT08 terminal closure or an aerial terminal closure such as a 3M™ SLiC™ Fiber Aerial Terminal Closure 530, both available from 3M Company, St. Paul, Minn.

In FIG. 3A, the orientation control section 170 is positioned on the tubular housing 110A between the cable strain relief attachment surface 160 and the annular channel 180 which is configured to hold a sealing member (not shown), such as an o-ring or a gasket. The external dimensions of the orientation control section may be somewhat larger than the remainder of the tubular housing. In some embodiments of the current invention, the orientation control section 170 determines the ultimate cross-sectional diameter of the inlet device. Portions of the orientation control section 170 may form abutment surfaces 182 which extend from the generally cylindrical surface of the tubular housing 110A. These abutment surfaces can cooperate with a shoulder (not shown) in the port 310 of a telecommunications enclosure 300 to properly seat the inlet device 100 in the telecommunications enclosure.

The orientation control section 170 may have an external shape comprising a polygonal shape including a plurality of facets 183, while the rear portion of the enclosure port may have a corresponding female shape. Alternatively, the orientation control section may have any external polygonal shape on the outer surface of the unibody housing comprising at least one flat facet and at least one arcuate section such that the unibody housing has a truncated circular cross-section or a D-shaped cross-section. The external shape of the orientation control section 170 engages with least a potion of a corresponding female shape port in the telecommunications enclosure. Alternatively, the orientation of the inlet device may be controlled by the shape of the tubular housing.

The sealing member may be positioned in an annular channel 180 in the tubular housing 110A. The channel is preferably situated proximate to the orientation control section. In one embodiment, the sealing member can include an o-ring.

The lock engagement feature 190 can be in the form of a groove or trench and can be located between annular channel 180 and strength member securing section 140. When the device is fully seated within the port 310 of a telecommunication enclosure 300, the lock engagement feature 190 is disposed inside of the telecommunications enclosure. A keying mechanism such as a forked locking key 195 (FIG. 4A) may be inserted into the engagement feature to securely fasten the device in the port 310 of the telecommunications enclosure 300. The exemplary forked locking key has a handle 196 and two tines 197 which extend from the handle. The two tines 197 fit into the lock engagement feature 190 on either side of the tubular housing 110A, B, C to prevent the device from slipping when the inlet device 100 is installed in the port 310 of a telecommunication enclosure 300.

One advantageous aspect of the disclosed inlet device 100 is that the optical fiber passes freely through the device without significant pressures or forces acting on the optical fiber. The cable may be securely attached to the first end 115 of the tubular housing by the protective sleeve and by the strength members of the telecommunication cable attached to the strength member securing section 140 at the second end 117 of the tubular housing 110A, B, C.

The inlet device 100 may be formed of any suitable plastic material. In one embodiment, the tubular housing and locking key are formed of polymeric materials by methods such as injection molding, extrusion, casting, machining, and the like. For example, these parts may be made of molded polypropylene, polyoxymethylene, nylon, polypropylene/nylon alloys or glass filled versions of these polymers. Material selection will depend upon factors including, but not limited to, chemical exposure conditions, environmental exposure conditions including temperature and humidity conditions, UV exposure conditions, flame-retardancy requirements, material strength, and rigidity, to name a few.

Figure 2:
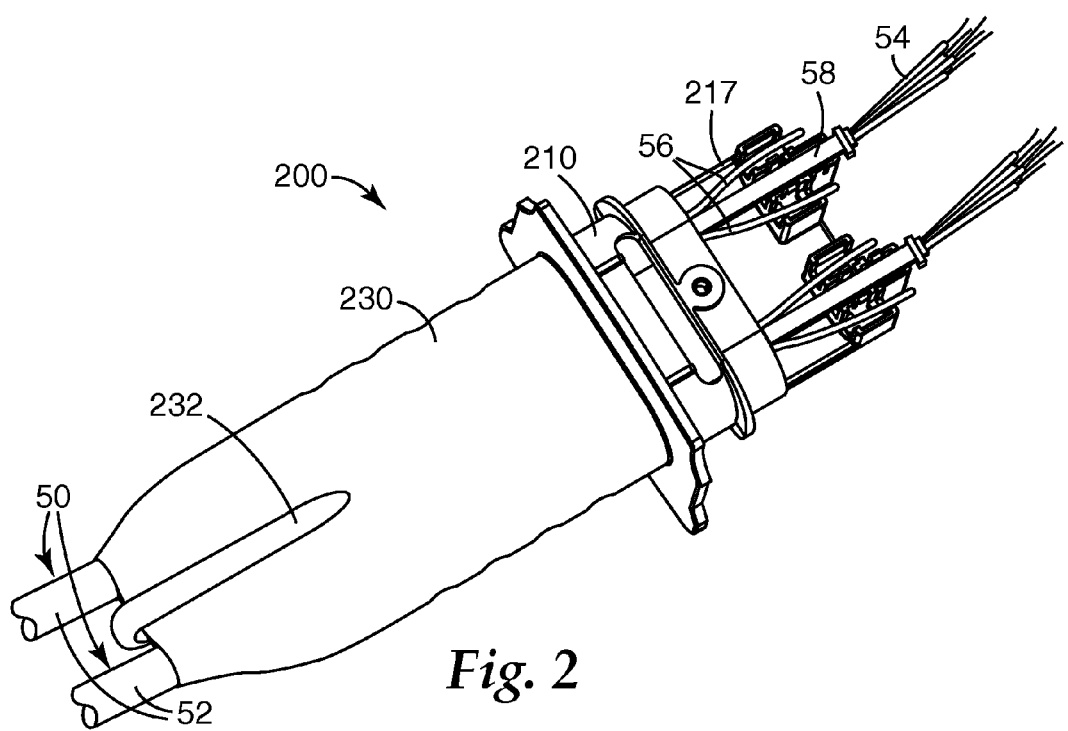
FIG. 2 shows an inlet device according to an alternative embodiment of the present invention.

An alternative embodiment of an exemplary inlet device 200 is shown in FIG. 2. The inlet device 200 can be mounted to a pair of fiber optic cables 50. The inlet device 200 includes a tubular housing 210 having a first end 215 (see FIG. 3D) and a second end 217 and a protective sleeve 230 attached to the first end of the housing. A clip 232 can be used to secure the protective sleeve between the pair of fiber optic cables.

Figure 3D:
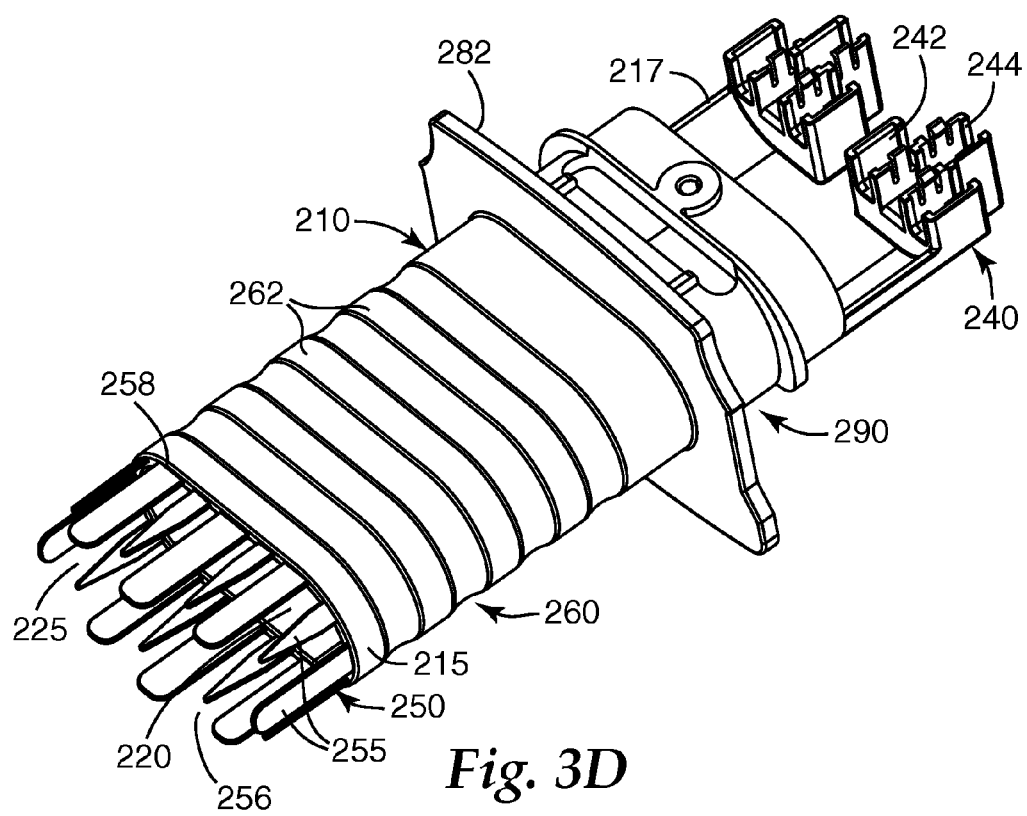

FIG. 3D shows an exemplary embodiment of the tubular housing 210 of inlet device 200 shown in FIG. 2. The tubular housing 210 may have a generally elliptical cross-section. The tubular housing 210 includes an interior passageway 220 that extends along the length of the tubular housing from the first end 215 to the second end 217 of the tubular housing. The tubular housing 210 has a passage entry 225 leading into the interior passageway 220 at the first end of the tubular housing that may be configured to accommodate a variety of telecommunication cables including single fiber drop cables and multi-fiber cables.

Alternative designs are contemplated in which the inlet device can accommodate more than two telecommunication cables. In these alternative embodiments, an extra strength member securing section is added for each additional telecommunication cable that is introduced. Thus, when three telecommunication cables are accommodated by an embodiment of the inventive inlet device, the tubular housing can have three strength member securing sections.

FIG. 3D shows the tubular housing 210 including a compressible portion 250 formed at the first end 215 of the tubular housing. The compressible portion 250 may be reduced in size when an external force is exerted radially on it such as by application of a protective sleeve 230 (see FIG. 2). The compressible portion centers the telecommunication cables in the inlet device when the inlet device is installed. The compressible portion 250 may include a plurality of spaced apart flexible fingers 255 which surround the passage entry 225.

The flexible fingers 255 may be rectangular, triangular or trapezoidal in shape or a combination thereof. When the fingers have a trapezoidal or triangular shape, the terminal end 256 of the finger may be narrower than at the base 258 of the finger. In some embodiments of the invention, the flexible fingers 255 may include barbs (not shown) on the terminal ends 256 of the fingers that can penetrate and grab the outer sheath of a telecommunications cable that is installed in the inlet device. The fingers should be spaced apart by a sufficient distance so that they do not overlap after deformation caused by the applying of the external force on the compressible portion of the tubular housing. The number, shape width and length of the fingers may be optimized based on the diameter of the tubular housing and the diameter of the telecommunication cables to be accommodated by the inlet device.

The tubular housing 210 may also include a pair of strength member securing sections 240 formed at the second end 217 of the tubular housing to each accommodate one of the telecommunication cables. Each of strength member securing sections can be configured to fasten at least one strength member of a telecommunication cable to the tubular housing. Each strength member securing section 240 can include a furcated structure having a central channel 244 for the optical fibers to pass through and at least one peripheral channel 242 for securing at least one strength member. When a strength member is inserted into a peripheral channel 242, it can be locked in place by at least one mechanical fastener or pin 236 (see FIG. 6) such that the strength member is trapped between the mechanical fastener and the peripheral channel.

Other features of the tubular housing 210 may include cable strain relief attachment surface 260, an annular channel 280 to hold a sealing member, and a lock engagement feature 290. Unlike the embodiment of the tubular housing 110A, B, C shown in FIGS. 3A-C, exemplary tubular housing 210 shown in FIG. 3D does not require a separate orientation control section, since the orientation control can be accomplished by the elliptical cross-section of the tubular housing.

The cable strain relief attachment surface 260 is located between the passage entry 225 and the stopping plate 282. The protective sleeve 230 fits over the cable strain relief attachment surface 260 to secure and provide a water resistant and/or dustproof seal around the telecommunication cables when it is installed in the inlet device. This protective sleeve also provides a strain relief to the cables by maintaining the proper bend radius of the cable when it is installed in a telecommunications enclosure. Also, the cable strain relief member provides retention of the cable against pull-out forces. An additional clip(s) 232 (FIG. 2) may be fastened over the protective sleeve between the two cables to ensure proper cable retention and positioning.

In one embodiment, the cable strain relief attachment surface 260 may have a smooth surface texture. In another embodiment, the cable strain relief attachment surface may have a ribbed, undulating or other rough surface texture. FIG. 3D shows an embodiment of the tubular housing 210 having ridges 262 on the cable strain relief attachment surface 260.

A stopping plate 282 extends radially from the body between the strength member securing sections 240 and the cable strain relief attachment surface 260. The stopping plate 282 prevents the inlet device from being inserted too far into a complementary shaped port 320 in a telecommunication enclosure 300 (see FIG. 5B).

A sealing member (not shown) may be positioned adjacent to the stopping plate near strength member securing sections 240 of the tubular housing 210. The sealing member may be a gasket or an O-ring which can be compressed between the stopping plate and the external surface of a port in a telecommunication enclosure when the inlet device is installed in the port.

Figure 4B:
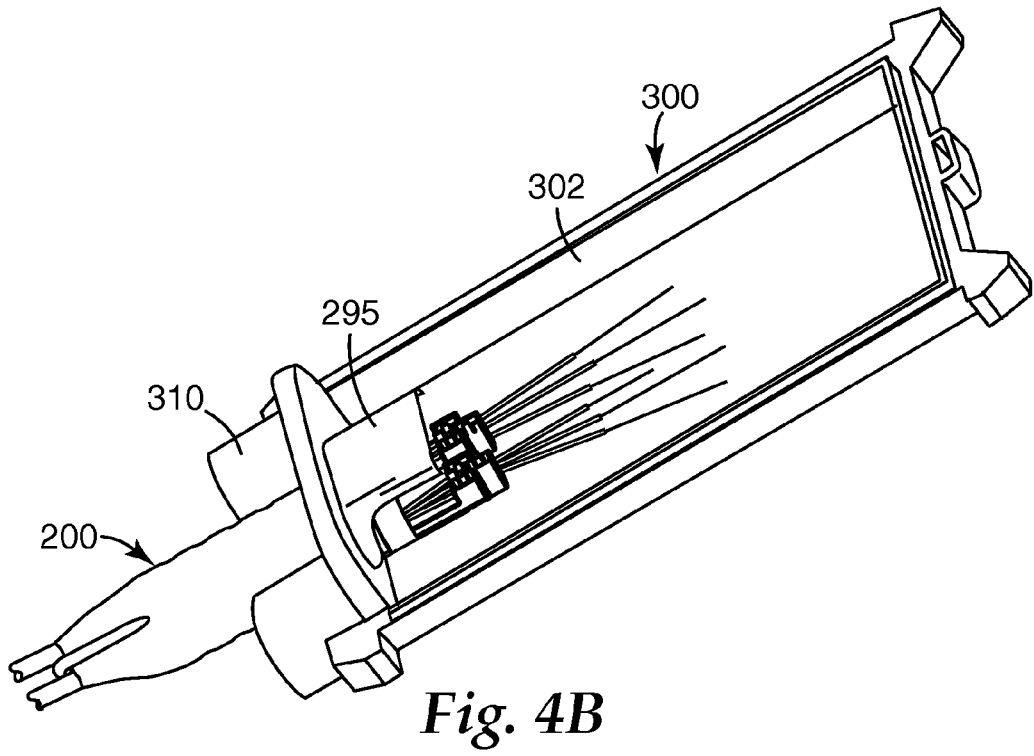

The lock engagement feature 290 can be in the form of a groove or trench and can be located between stopping plate 282 and strength member controlling section 240. When the inlet device 200 is fully seated within the port 320 of a telecommunication enclosure 300, the lock engagement feature is inside of the telecommunications enclosure as shown in FIG. 4B. A keying mechanism such as a forked locking key 295 (FIG. 4B) may be inserted into the engagement feature to securely fasten the device in the port 310 of the telecommunications enclosure 300.

The inlet device 200 may be formed of any suitable plastic material. In one embodiment, the tubular housing and locking key are formed of polymeric materials by methods such as injection molding, extrusion, casting, machining, and the like. For example, these parts may be made of molded polypropylene, nylon, polypropylene/nylon alloys or glass filled versions of these polymers. Material selection will depend upon factors including, but not limited to, chemical exposure conditions, environmental exposure conditions including temperature and humidity conditions, UV exposure conditions, flame-retardancy requirements, material strength, and rigidity, to name a few.

The inlet device may be sized to fit in a variety of port sizes for a telecommunication enclosure. For example, the housing of the inlet device may be sized to fit into small circular, single fiber ports having a size from about 4 mm (0.16 in.) to about 10 mm (0.39 in.) (FIG. 3C). Single entry contoured ports may be size configured to accept a fiber optic cable having a diameter of about 5 mm (0.2 in.) to about 20 mm (0.79 in.) (FIGS. 3A, B) and the double entry or elliptical ports may be configured to accept at least two fiber optic cables having a diameter of about 4 mm (0.16 in.) to about 30 mm (1.2 in.). Of course, the housing may be designed to fit into other standard and non-standard port sizes as necessary.

An exemplary method of installing an inlet device 100 onto a fiber optic cable 50 is now described. The exemplary cable has a single optical fiber housed in a protective loose buffer tube having two peripheral strength members located on either side of the buffer tube. About 35.5 cm (14.0 in) to about 71.0 cm (28.0 in) of the semi-rigid outer sheath or jacket can be removed from the cable to expose the loose buffer tube containing at least one optical fiber 54 and the strength members. However, the length of buffer removed will depend on the strength members can be trimmed so that they extend about 1.9 cm (0.75 in.) from the end of the remaining outer sheath. A small drop of fast drying adhesive (i.e. an epoxy adhesive such as Loctite 480™ adhesive available from Henkle Loctite Corporation (Rockwood, Conn.), or a cyanoacrylate such as 3M™ Scotch-Weld™ Instant Adhesive CA8 available from 3M Company (ST. Paul, Minn.)) may be applied to the loose fiber strength members to create at least one semi-rigid strength member to facilitate assembly into the inlet device.

A protective sleeve 130 can be slid onto the cable. The prepared end of the cable can be inserted into the first end 115 of the tubular housing 110 through passage entry 125. The cable is fed through the passageway in the tubular housing. The strength member(s) 56 may be positioned into the peripheral channel(s) 142 disposed in the strength member securing section 140 and the fiber or electrical conductor may be laid in the central channel 144 disposed in the strength member securing section 140. The cable strength members can be held in the peripheral channels 142 using a mechanical fastener to trap the strength members between the peripheral channel 142 and the mechanical fastener 236. Optionally, an adhesive material may be placed in the peripheral channels to provide additional holding power of the strength members. The optical fibers or electrical conductor(s) may be secured in the central channel by applying a cable tie around the end of the central channel.

The protective sleeve 130 can be slid over the cable strain relief attachment surface 160. In an exemplary embodiment, protective sleeve comprises an approximately 15.2 cm (6 in.) long piece of adhesive coated heat shrink tubing such as HDT-A 38/12 tubing available from 3M Company (St. Paul, Minn.). Heat can be applied to the heat shrink tubing to collapse it tightly around the cable strain relief attachment surface 160 and the compressible portion 150 of the tubular housing causing the flexible fingers 155 to press against the cable, thus, centering the cable in the inlet device 100. Optionally, an adhesive coated heatshrink sleeve of a cold shrink sleeve may be used as the protective sleeve.

Optionally, in the case where the inlet device is being installed on the end of an optical fiber cable, a fiber optic connector (not shown) may be attached to the terminal end of the optical fiber(s) to facilitate connection the optical fibers into the network. Fiber optic connectors may include SC, ST, FC, or LC connectors, to name a few, and may be, for example, either a positive contact (PC) or an angled polished connector (APC) type of connector. Sample connectors include 3M™ No Polish Connector SC Plug, 3M™ Hot Melt LC Connector, and 3M™ CRIMPLOK™ ST SM 126 UM Connector, each of which is available from 3M Company (St. Paul, Minn.). In some embodiments of the present invention, no connectors may be put on the end of the optical fiber, instead the free ends of the optical fiber may be spliced into the network using either fusion splices or mechanical splices such as 3M™ Fibrlok™ II mechanical splices available from 3M Company (St. Paul, Minn.). Alternatively, a field mountable connector such as SC, ST, FC, or LC connectors, to name a few, or 3M™ SC No Polish Connector available from 3M Company (St. Paul, Minn.).

The inlet device, described above, provides a simple and user-friendly design thereby greatly facilitating the installation of the last leg of the FTTH network to the end user. Additionally, the inlet device can require less space inside the telecommunication enclosure.

Various modifications including extending the use of the inlet device to applications with copper telecommunication cables or copper coax cables, equivalent processes, as well as numerous structures to which the present invention may be applicable will be readily apparent to those of skill in the art to which the present invention is directed upon review of the present specification.

I claim:

1. An inlet device to be fitted to a communication cable, the device comprising:
   a one piece tubular housing having a first end and a second end;
   the housing having a compressible portion at the first end of the housing to conform to an outer surface of the communication cable;
   the housing including a strength member securing section formed on the second end of the housing and configured to secure a strength member of an telecommunication cable to the housing; and
   a protective sleeve fitted over the compressible portion to center the communication cable in the inlet device.

2. The inlet device of claim 1, wherein the compressible portion includes a plurality of spaced apart flexible fingers.

3. The inlet device of claim 2, wherein the flexible fingers include barbs on the terminal ends of the fingers that penetrate and grab a jacket of a telecommunications cable installed in the inlet device.

4. The inlet device of claim 1, wherein the compressible portion includes a fluted entry portion.

5. The inlet device of claim 1, wherein the housing comprises a polygonal shaped orientation control section formed on an outer surface of the housing that is engageable with a corresponding port in a telecommunications enclosure.

6. The inlet device of claim 1, wherein the telecommunication cable is an optical fiber cable wherein the optical fiber cable comprises one or more optical fibers.

7. The inlet device of claim 6, wherein the strength member securing section comprises at least one peripheral channel for retaining the at least one strength member and a central channel to accommodate the optical fibers.

8. The inlet device of claim 1, further comprising a locking mechanism configured to secure the inlet device into a port of a telecommunications enclosure.

9. The inlet device of claim 1, wherein the inlet device is installed into a port in a telecommunication enclosure.

10. A telecommunication enclosure comprising the inlet device of claim 1 installed into a port formed in the enclosure.

11. An optical fiber cable assembly, comprising:
    an optical fiber cable having at least one optical fiber and at least one strength member;
    an inlet device mounted on an end of the optical fiber cable, the inlet device comprising:
      a one piece tubular housing having a first end and a second end; the housing having a compressible portion at the first end of the housing to conform to an outer surface of the communication cable;
      the housing including a strength member securing section formed on the second end of the housing and configured to secure a strength member of an optical fiber cable to the housing; and
      a protective sleeve fitted over the compressible portion to center the communication cable in the inlet device; and
    an optical fiber connector attached to a terminal end of the optical fiber of the optical fiber cable.

12. The optical fiber cable assembly of claim 11, including first and second inlet devices mounted on the cable.

13. An optical fiber cable assembly of claim 11, wherein the optical fiber cable comprises one of a multi-fiber ribbon cable, single fiber cable and multi-fiber loose buffer tube cable.

14. The optical fiber cable assembly of claim 11, wherein the cable assembly is installed into a port in a telecommunication enclosure.

15. The inlet device of claim 1, wherein the inlet device comprises two strength member securing sections formed on the second end of the housing; each configured to secure a strength member of an optical fiber cable to the housing of the inlet device.

16. The optical fiber cable assembly of claim 11, wherein the inlet device comprises two strength member securing sections formed on the second end of the housing; each configured to secure a strength member of an optical fiber cable to the housing of the inlet device.

* * * * *